United States Patent [19]

Schreiber et al.

[11] Patent Number: 4,590,038
[45] Date of Patent: May 20, 1986

[54] FLUIDIZING-CELL COLUMN

[75] Inventors: Georg Schreiber, Kiefernweg 7, 5000 Koln 7; Heinrich Lob, Troisdorf-Eschmar, both of Fed. Rep. of Germany

[73] Assignee: Georg Schreiber, Cologne, Fed. Rep. of Germany

[21] Appl. No.: 476,434

[22] Filed: Mar. 17, 1983

[30] Foreign Application Priority Data

Mar. 19, 1982 [DE] Fed. Rep. of Germany ....... 3210117

[51] Int. Cl.⁴ .......................... B01D 11/00; B01D 9/02; B01J 8/20
[52] U.S. Cl. .................................... 422/142; 422/257; 422/252; 422/245
[58] Field of Search ............... 422/139, 142, 145, 257, 422/245, 251, 189, 190, 191, 252; 261/110, 123; 134/25.1, 25.5; 210/177, 772, 774; 366/336-340

[56] References Cited

U.S. PATENT DOCUMENTS

| | | | |
|---|---|---|---|
| 2,011,186 | 8/1935 | Van Dijck | 422/257 |
| 2,044,421 | 6/1936 | Cooke | 422/189 |
| 4,444,729 | 4/1984 | Gradl et al. | 422/257 |

FOREIGN PATENT DOCUMENTS

| | | | |
|---|---|---|---|
| 878188 | 6/1953 | Fed. Rep. of Germany | 422/257 |
| 1136307 | 9/1962 | Fed. Rep. of Germany | 422/257 |
| 0655417 | 5/1979 | U.S.S.R. | 366/336 |

Primary Examiner—Hiram H. Bernstein
Attorney, Agent, or Firm—Felfe & Lynch

[57] ABSTRACT

To permit the output of a vertical fluidizing-cell column to be increased, its cross-sectional area to be enlarged, and the installation of plates in the column to be simplified, the plates are made conical or pyramidal with their concave and convex sides alternately directed upwardly. The plates have central openings for the passage of one stream of material, and are mounted in the column with peripheral passages for another stream of material. Preferably the plates are movable relative to each other and have movable center pieces variably closing some of the central openings for varying the operation of the column.

8 Claims, 6 Drawing Figures

FLUIDIZING-CELL COLUMN

BACKGROUND OF THE INVENTION

The invention relates to a fluidizing-cell column.

Flat-plate fluidizing cell columns have been used, for example, in mass-transfer operations for removing by-product-containing mother liquors adhered to a crystallized product as so-called residual moisture. (See German Pat. No. 23 55 106.) The inclined installation of these flat plates which, on the one hand, must be mounted in the column so as to be mechanically stable, and which, on the other hand, must leave openings for the passage of the fluid between the inside wall of the column and the inclined plate (which occupies the major portion of the column cross section), is not without problems.

To prevent the leakage flow of particles which also can occur at the openings between these flat plates and the inside wall of the column, it has been proposed to construct the plates so that each forms a curved surface with its edge bearing against the column wall with stress. One or more openings are then provided for the passage of the stream of formed. (See German patent application DOS No. 27 35 972.)

In these prior-art arrangements, the column diameter is limited to about 1.5 meters. The efficiency of fluidizing-cell columns with flat inclined plates or with curved plates, expressed as the height of a theoretical plate between two actual plates, is not fully satisfactory for all applications. In combination with the mechanical difficulties with plate-like, inclined structures in a column, the problems have prompted unsuccessful efforts to find a better solution. Thus there has been an unfilled need to develop a fluidizing-cell column with increased output, a larger cross-sectional area, and simplified installation of plates.

SUMMARY OF THE INVENTION

This need is met by the invention. In accordance therewith, conical or pyramidal plates (herein both also denominated coned plates) are disposed in a column so that their concave and convex sides are alternately directed upwardly. Each plate has a central opening.

Every two plates with facing convex sides form a separating chamber in which, in operation, the fluidization produces a separation into treating liquid and treated liquid or suspension. The treating liquid flows into each separating chamber through the central opening in the lower plate and out toward the next higher chamber through an opening between the periphery of the upper plate and the inner circumference of the column. The liquid or suspension fluid material to be treated flows into each separating chamber through the central opening in the upper plate and out through a peripheral opening about the lower plate.

Any flow instabilities which may arise from local particle concentrations, and any density differences resulting therefrom, are dissipated by the mixing which occurs in the adjacent mixing chambers formed between the two plates whose concave sides face each other. An ascending flow and a descending flow pass from the mixing chamber through the central openings of the upper and lower plates into the upper and lower adjacent separating chambers, respectively, as noted with respect thereto.

The plates may be peripherially mounted, preferably by being appropriately bent back horizontally and bolted, on rings, ring segments or straps which are secured to the inner circumference of the column. In a particularly preferred embodiment, however, the plates are secured, through appropriate bolted joints, for example, to holding rods which extend vertically through the plates from the upper part of the column to its lower part in spaced alignment with the longitudinal axis of the column.

It is also preferred that the central openings in the plates with concave sides directed downwardly be covered (partly closed) with center pieces. These may be mounted, for example, on a movable holding rod on the longitudinal axis of the column. This allows the column to be readily adapted to different operating conditions. Controllable partial closing of the central openings might also be accomplished by movably positioning the plates in the column and holding the center pieces therein.

The plates, together with the center pieces and the rings or straps which abut on the inside wall of the column, may also be formed as a compound structure adapted to be displaced upwardly, as a unit, by one-half the distance between two plates, for example. This will permit the column to be kept free of any encrustation by the product being treated which might build up in certain areas of the plates, and particularly in proximity to the peripheral passages. In all these proposed arrangements, the plates themselves do not make direct contact with the inside wall of the column and therefore can be removed or replaced.

Peripheral serrations on at least the upper plate of at least some separation chambers preferably provide, in cooperation with an adjacent ring, improved adjustability of the area of the peripheral passage between the plate and the peripheral column. This permits the output of the column to be further controlled and adapted to different requirements.

The cross-sectional areas of fluidizing-cell columns with the prior-art inclined flat or dished plates are limited to permit adequate separating action to be secured and correspond to a maximum column diameter of about 1.5 meters. With the proposed design, substantially improved separating action is achieved especially with column inside diameters ranging from 0.1 to 6 meters, and preferably from 1.5 to 4 meters. The flow pattern in every chamber of the column in accordance with the invention also has components in all three space coordinates whereas the flow pattern in fluidizing-cell columns with flat plates in essence has components in only two space coordinates. The flow velocity is also reduced in keeping with the larger surface between the central openings in the plates constructed in accordance with the invention and the peripheral passages. This latter produces an advantageous effect with respect to the operation of the column.

At the same time, the fluid-flow velocity can be increased in the mixing chambers. For this, the distance between the peripheries of two adjacent plates whose concave sides are facing each other and which form the mixing chamber therebetween are spaced from 0.1 to 1.0 times the spacing between the peripheries of two adjacent plates whose convex sides are facing each other and which form the separating chamber. In other words, the height of a mixing chamber is no greater than the height of a separating chamber, that is to say, from 0.1 to 1.0 times the height.

The applications of the proposed fluidizing-cell column include the practice of fluidized-bed techniques when suspensions are introduced; countercurrent processes, for example, in transfer from the continuous phase; concurrent processes, for example, in the performance of chemical reactions with specific residence times; crystallizations and the like; particle classification; and cascade methods in the use of homogeneous liquids.

In the operation of the fluidizing-cell column of the invention by the concurrent method, some or all backflow openings may be dispensed with or closed. Backflow openings are, for example, the annular, peripheral clearance between a ring and its plate and the annular clearance between the center piece and its plate.

BRIEF DESCRIPTION OF THE DRAWINGS

Preferred embodiments which illustrate but do not limit the invention will now be described in greater detail with reference to the accompanying drawings, wherein.

DESCRIPTION OF THE PREFERRED EMBODIMENTS

Figure 1:
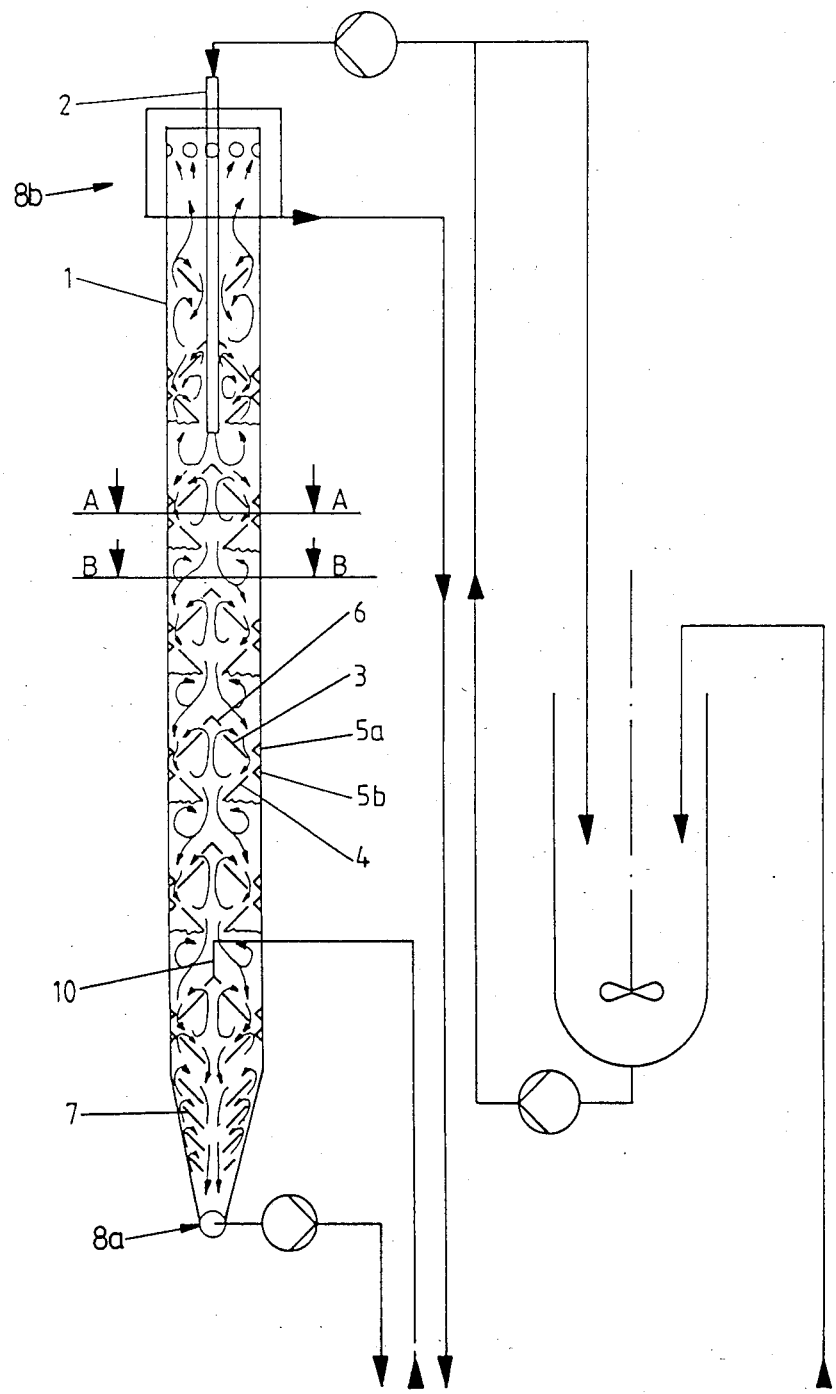
FIG. 1 is a sectioned schematic elevation of one preferred and associated supply apparatus.

FIG. 1 shows a longitudinal section through the axis of a vertical fluidizing-cell column 1 with an inlet 2 in the upper part of the column for the liquid to be treated, for example a suspension pumped from an agitated feed vessel as shown schematically in the Figure. Pairs of centrally-apertured alternately-oriented conical or pyramidal plates 3 and 4 have their peripheries supportingly spaced from the column at rings 5a and 5b. Center pieces 6 cover the central opening in the upper plate 3 of each pair 3, 4 to define and annular path for radial flow therebetween. An inlet 10 for the treating liquid is in the lower part of the column. The treated stream of material is thickened in the lower part of the column by inclined plates 7, which may be conical plates or flat plates, for example, and discharged at 8a through a pump. The treating liquid is drawn off in the upper part of the column at 8b.

The conical or pyramidal plates, herein both described as coned plates, preferably have vertex angles of from about 60° to about 160°. More preferably, when cones, they have vertex angles of from about 60° to about 150° and, when pyramids, of from about 80° to about 160°.

Figure 2A:
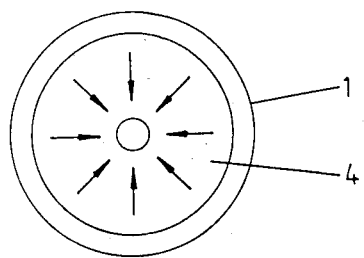
FIG. 2a is a cross-sectional plan view of a portion of the embodiment shown in FIG. 1.

FIG. 2a shows a section through the column 1, taken along the line A—A. A plate 4 whose concave side is directed upwardly is visible. The flow lines in proximity to the plate 4 are indicated.

Figure 2B:
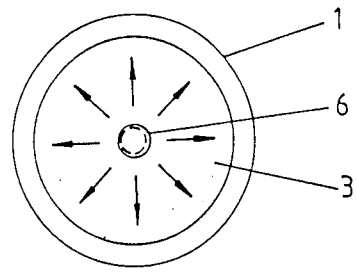
FIG. 2b is a cross-sectional plan view of another portion of the embodiment shown in FIG. 1.

FIG. 2b shows a section through a column 1, taken along the line B—B. A plate 3 whose convex side is directed upwardly is shown along with the center piece 6. The flow lines in proximity to the plate 3 are indicated.

Figure 3:
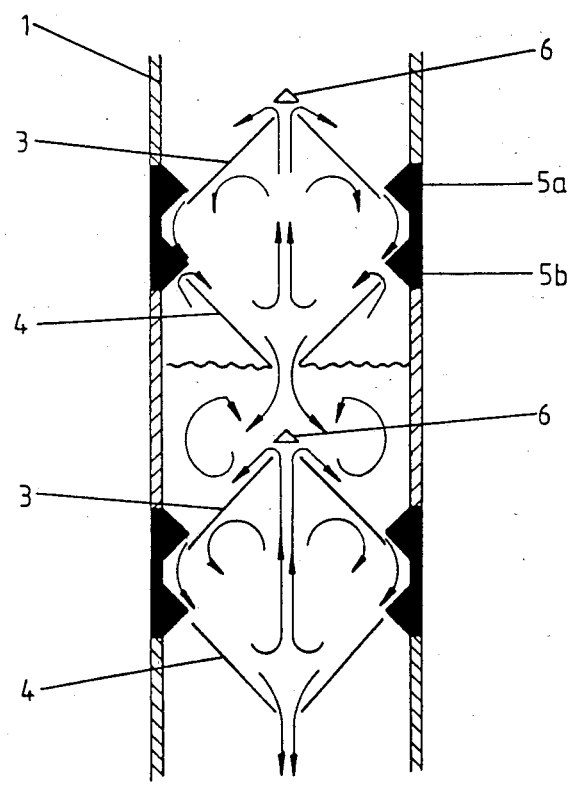
FIG. 3 is a sectioned, enlarged schematic elevation of a portion of the preferred embodiment shown in FIG. 1.

FIG. 3 is a highly diagrammatic, enlarged, partial longitudinal section of more detail of the fluidizing-cell column shown in FIG. 1 with two plates 3, 4 and two center pieces 6 over the two plates 3. A separating chamber is formed between the middle pair of plates with central openings in the plates and spaces between the plates and the column wall for the indicated liquid streams. The main flow lines and the rings 5a and 5b secured to the inside wall of the column are shown schematically.

Figure 4:
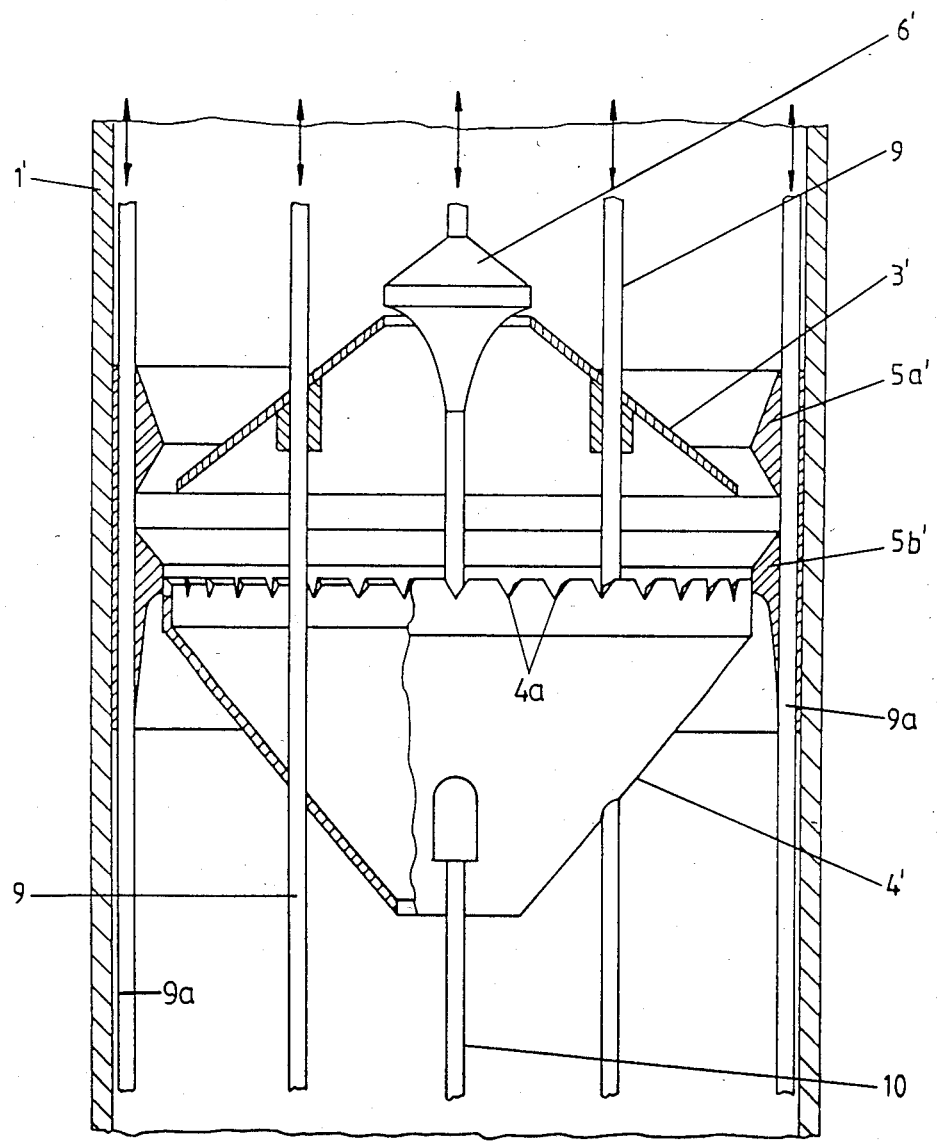
FIG. 4 is a sectioned elevation of a portion of another preferred embodiment.

FIG. 4 shows a partial vertical section of another fluidizing-cell column 1' with plates 3' and 4' and rings 5a' and 5b'. Vertically displaceable holding rods 9, 9a, and 10 movably support the plates, rings, and center piece 6' respectively. They can be moved, either individually or jointly as a compound structure, to adjust the operation of the column. The plate 4' provided with a peripheral serration 4a for the peripheral fluid flow.

Figure 5:
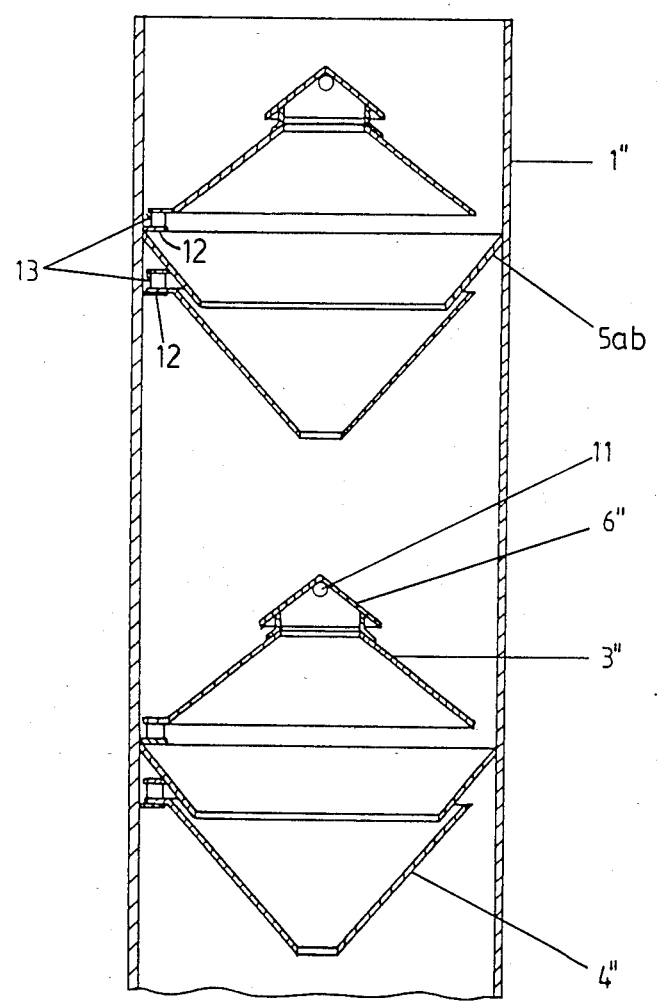
FIG. 5 is a sectioned elevation of a portion of still another preferred embodiment.

FIG. 5 shows a portion of another embodiment of a fluidizing-cell column 1". The center pieces 6" are connected to the plates 3" and have vent openings 11. A single ring 5ab is between the plates 3", 4". Mounting means 12 which are secured to the inside wall of the column support the plates 3", 4" and ring 5ab via spacers 13.

Columns in the lower diameter range from about 0.1 to 0.5 meter may advantageously be made of glass, the compound structure of the plates and rings being held between flanges, for example. When the column is made of metal, the compound structure of the plates and rings 5a and 5b may be welded onto the wall of the column 1. (See FIG. 3.)

It will be appreciated that the instant specification and claims are set forth by way of illustration and not of limitation, and that various changes and modifications may be made without departing from the spirit and scope of the present invention.

What is claimed is:

1. In a vertical fluidizing-cell column having plates disposed substantially across the inside of the column, and means for supplying a treating fluid to the lower end of the column and supplying fluid material to be treated to the upper end of the column, the improved apparatus comprising:

at least three coned plates each having a central opening and being disposed in the column with a peripheral opening thereabout, the plates having concave and convex sides alternately directed upwardly for defining in the column, between each pair of the plates having facing convex sides, a separating chamber and, between each pair of the plates having facing concave sides, a mixing chamber; and means for causing the treating fluid to flow into each separating chamber through the central opening in the lower plate of each separating chamber and out through the peripheral opening of the upper plate of each separating chamber and the fluid material to be treated to flow into each separating chamber through the central opening of the upper plate of each separating chamber and out through the peripheral opening of the lower plate of each separating chamber, the means comprising a center piece covering the central opening in the lower plate of each separating chamber and defining an annular path for radial flow therebetween.

2. Apparatus as in claim 1, wherein each coned plate is cone-shaped and has a vertex angle of from about 60° to about 150°.

3. Apparatus as in claim 1, wherein each coned plate is pyramid-shaped and has a vertex angle of from about 80° to about 160°.

4. Apparatus as in claim 1, wherein the concave sides of the upper most and lowermost plates are directed upwardly.

5. Apparatus as in claim 1, wherein the means for mounting each plate comprises at least segments of a ring and means for securing the plate to the ring, whereby the ring may be secured to the inside of the column to mount the plate.

6. Apparatus as in claim 1, and further comprising means for mounting each plate and each center piece in the column, the means comprising at least one rod extending longitudinally along the column, for relative movement of the same with the rod longitudinally of the column, whereby to adjust the operation of the column and facilitate replacing each plate.

7. Apparatus as in claim 1, and further comprising means for mounting each plate with its concave side directed upwardly with peripheral openings between the plate and the inside of the column, the means comprising serrations about the periphery of the plate.

8. Apparatus as in claim 1, wherein the means for mounting each coned plate space each two adjacent plates having concave facing sides about 0.1 to about 1.0 times the spacing between each two adjacent plates having facing convex sides.

* * * * *

UNITED STATES PATENT AND TRADEMARK OFFICE
CERTIFICATE OF CORRECTION

PATENT NO. : 4,590,038

DATED : May 20, 1986

INVENTOR(S) : Georg Schreiber, et al.

It is certified that error appears in the above-identified patent and that said Letters Patent is hereby corrected as shown below:

Col. 1, line 24, "the stream of formed." should read -- the stream of material formed.--

Signed and Sealed this

Seventeenth Day of February, 1987

Attest:

DONALD J. QUIGG

*Attesting Officer*     *Commissioner of Patents and Trademarks*